Aug. 25, 1953  G. E. CAMPBELL  2,649,988
METAL-TO-METAL SEATED VALVE POT COVER WITH
INDEPENDENT GASKET SEALING ADJUSTMENT
Filed May 11, 1951  2 Sheets-Sheet 1

INVENTOR.
GEORGE E. CAMPBELL
BY
Philip S. McLean
ATTORNEY

Aug. 25, 1953   G. E. CAMPBELL   2,649,988
METAL-TO-METAL SEATED VALVE POT COVER WITH
INDEPENDENT GASKET SEALING ADJUSTMENT
Filed May 11, 1951   2 Sheets-Sheet 2
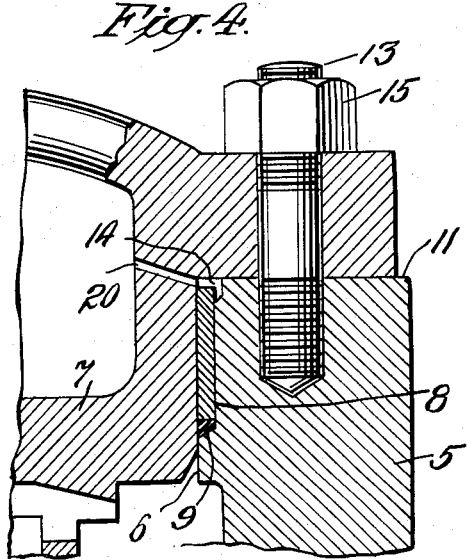
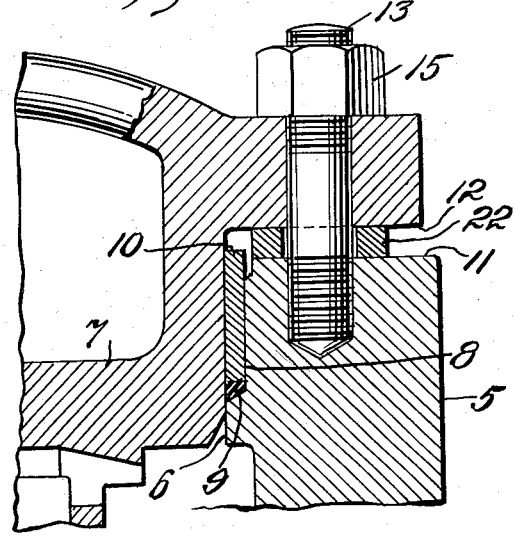
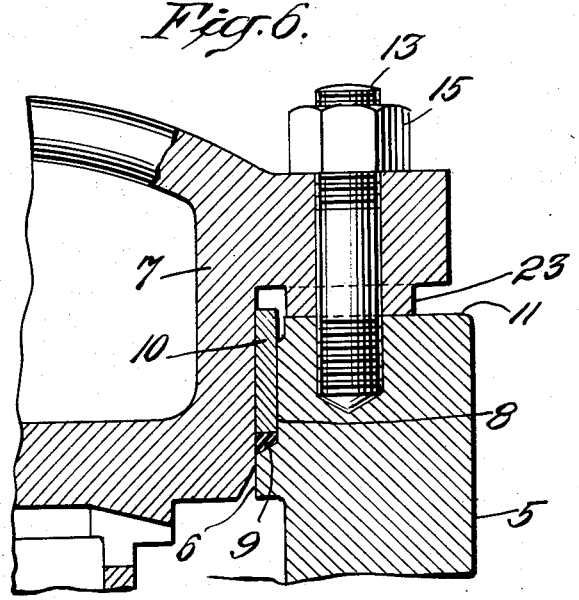
INVENTOR.
GEORGE E. CAMPBELL
BY
ATTORNEY Patented Aug. 25, 1953

2,649,988

UNITED STATES PATENT OFFICE 2,649,988

METAL-TO-METAL SEATED VALVE POT COVER WITH INDEPENDENT GASKET SEALING ADJUSTMENT

George E. Campbell, Chattanooga, Tenn., assignor to The Wheland Company, Chattanooga, Tenn., a corporation of Tennessee Application May 11, 1951, Serial No. 225,728

1 Claim. (Cl. 220—46)

The invention here disclosed relates to valve pot cover structure for the water ends of heavy duty, high pressure slush pumps.

In pumps of this character the practice has been to secure the covers over the water valves by a series of screw studs, leaving clearance between the valve pot and cover flange to permit adjustment required to make the gasket in the cover fluid-tight.

In such constructions, with the cover clamping the packing, the stud nuts can only be tightened to the compressive strength of the gasket and the gasket being made of yieldable material, there can be no assurance that the cover is evenly tightened all the way around or that it is secured in exact vertical alignment with the valve.

Further, in these heavy duty pumps the suction valve pots and covers are subjected to a partial vacuum on suction stroke and high pressure on discharge stroke, and this reversal of loads tends to cause a slight breathing action in the pot cover which is destructive to the gasket and permits the nuts on the studs to work loose.

It is known that nuts carrying a load on studs should be pulled down tight enough to put a tension in each stud equal to the load the stud is to carry. When a nut becomes loose the life of the stud is greatly reduced. Therefore, the initial tension in the stud set up by the nut should equal the load to be applied to the stud. This preloading of the stud cannot be applied where, as in pumps of conventional design, the only resistance under the valve pot cover is a yieldable gasket.

Resulting broken studs in valve pot covers of conventional design pumps have caused damage such as breaking of the valve pot, destroying the complete water end of the pump.

Objects of the present invention are to overcome and eliminate the inherent weaknesses and faults such as mentioned, of present day pumps.

Related objects of the invention are to accomplish all this in a thoroughly practical form of construction which can be produced at reasonable cost.

Other desirable objects attained by the invention are set forth or will appear in the course of the following specification, wherein detail features of the invention are disclosed and broadly claimed.

The drawings accompanying and forming part of the specification illustrate certain present commercial embodiments of the invention. Structure, however, may be modified and changed as regards the immediate illustration, all within the true intent and broad scope of the invention as hereinafter described and claimed.

Fig. 1 in the drawing is a broken cross sectional view of a valve pot and cover of the present invention, this view being taken on substantially the section line 1—1 of Fig. 3;

Figs. 4, 5 and 6 are broken sectional views illustrative of various possible modifications.

Figure 1:
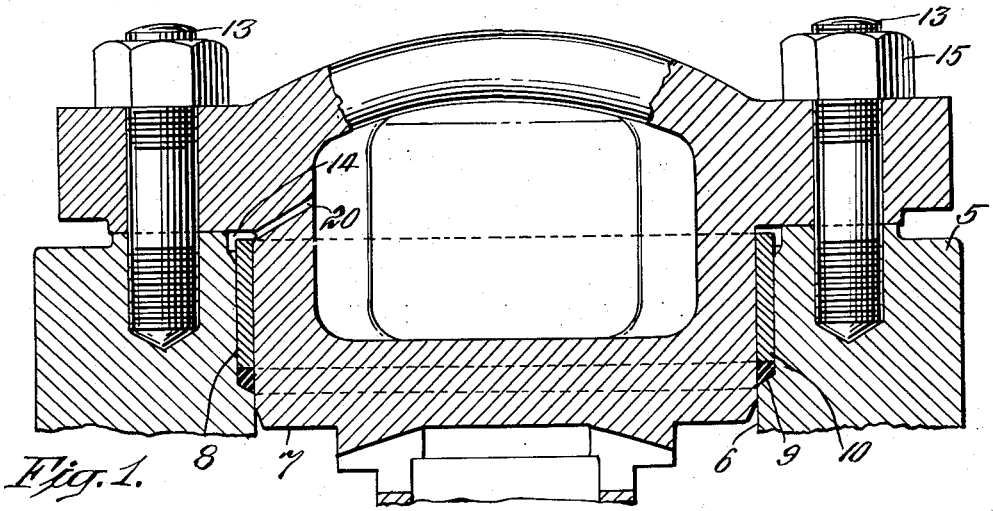

The present invention avoids the objections noted, and others, by seating the cover on the valve pot with a solid metal-to-metal engagement and by the provision of means for effecting the sealing adjustment of the gasket independently of the fixed seating of the cover on the pot.

In the illustrations the valve pot is indicated at 5, having a cylindrical bore 6 for the dependent cylindrical plug portion 7 of the cover, and a counterbore 8 at the top for the gasket 9 and a gasket compressing ring 10 loosely surrounding the upper part of the cylindrical plug portion.

The pot body is provided with a flat annular seat 11 surrounding the counterbore, and the flange portion of the cover is provided with a corresponding flat annular seat 12, these being machined square with the center line of the valve to maintain the cover, when seated, in absolute alignment with the valve.

These flat seating surfaces may be extended to any desired width, to assure all firmness. Here they are shown of a width for the stud bolts 13 to extend therethrough without interrupting continuous annular edges.

A clearance groove is shown provided at 14 at the inner edge of the annular seat 11, about the upper end of the counterbore 8.

With this metal-to-metal seating of the cover on the valve pot the nuts 15 overstanding the flange of the cover may be turned down to preload the studs to a stress which will insure maximum stud life.

The gasket is not affected by this solid seating of the cover and preloading of the studs.

This is assured by leaving the gasket seating ring 10 loose on the cover and by providing separate means, a set of cap screws 16 and thrust pins 17 in the illustration, for applying gasket compression force after fully securing the cover.

The thrust pieces 17 provide for free rotation of the gasket seating screws, facilitating accurate, even adjustment of the same.

When the cover is applied the gasket seating and sealing screws are backed off so that the stud nuts may be tightened to fully secure and preload the studs without affecting or being affected by the gasket.

Then, after fully securing the cover in its metal-to-metal seated engagement on the valve pot, the screws 16 may be turned down evenly to apply only sufficient pressure on the gasket to effectively seal off fluid.

To keep the cover as a single unit the gasket ring 10 is shown as slidingly held on the cylindrical portion of the cover by screw pins 18 in the sides of the cover having their outer ends in transverse slots 19 in the ring.

This construction permits free gasket pressure applying movements of the ring but causes the ring to remain attached to the cover when the cover is removed from the valve pot.

One or more bleeder holes may be provided to release any leakage appearing at the groove 14 at the top of the packing counterbore.

Figure 2:
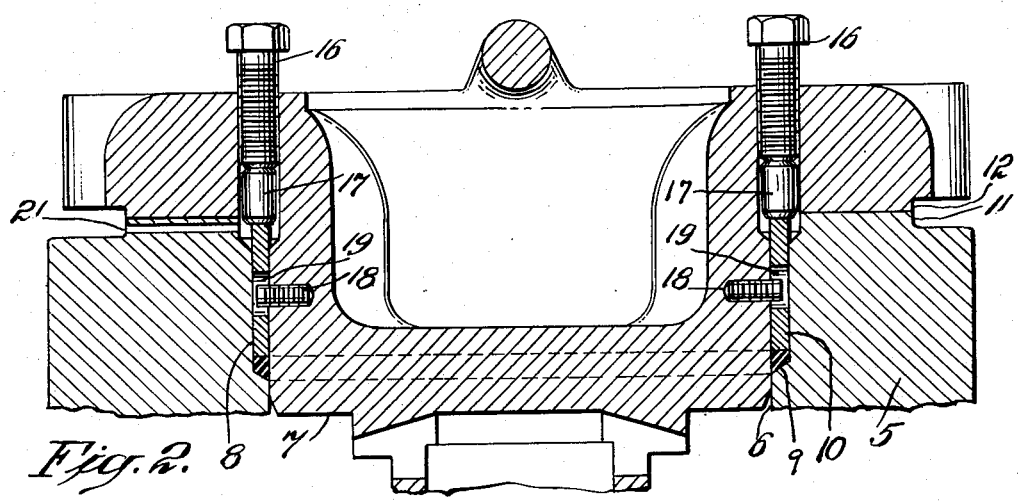
Fig. 2 is a broken cross sectional view as on substantially the plane of line 2—2 of Fig. 3.
Figure 3:
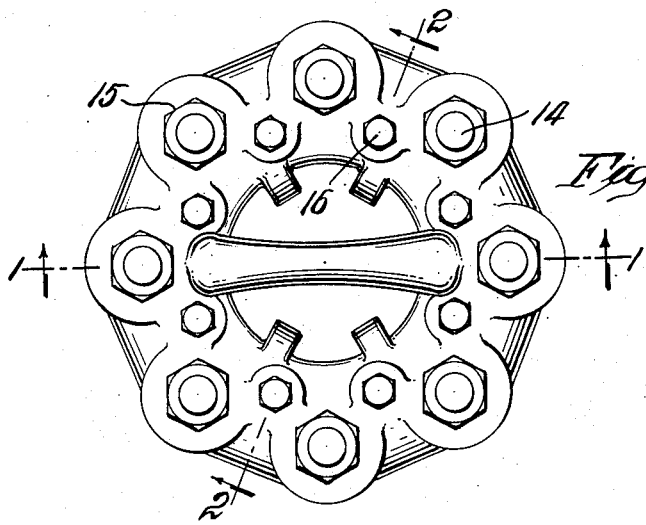
Fig. 3 is a plan view of the new valve pot cover structure.

In Fig. 1 a small hole 20 is shown extending through the cylindrical wall into the hollow central portion of the cap or cover, and Fig. 2 shows how a hole or groove 21 may be extended through the seat 11 for the cover flange. Either or both may be provided and in each instance indication is afforded as to just how tight the gasket should be set to seal off pressure.

With the metal-to-metal seating of the valve pot cover, preloading of the valve pot studs and adjustment of the gasket to a desired minimum sealing pressure independently of the cover seating, perfect alignment of the cover with the top of the valve is maintained, breakage of studs and other injuries are avoided and longer gasket life is obtained.

The construction is simple and sturdy and can be produced at low cost.

Fig. 4 illustrates one of the possible variations of the invention, in which both valve pot and cover flange are machined flat, full width, to give a maximum of metal-to-metal engagement.

Fig. 5 shows how metal-to-metal seating may be accomplished by interposition of metal bushings or spacer washers 22 between the valve pot and cover flange. These bushings afford solid metal-to-metal support for the cover and have the advantage of providing spaces between the bushings located about the studs, for channeling any telltale leakage from the gasket.

To avoid objection as to these bushings being extra, needed parts, they may be made integral, in the nature of bosses on the valve pot or cover, or both, as indicated at 23, Fig. 6.

In all these constructions the cover can be pulled down tight, metal-to-metal on the valve pot, and the stud bolts stressed to a preloaded condition without putting any pressure on the gasket. Independent means are provided for tightening the gasket and opening or openings provided whereby any fluid leaking past the gasket will escape to outside the valve pot, to give notice that the gasket needs to be further tightened.

What is claimed is:

In combination, a heavy duty pump valve pot subjected alternately to high pressure and partial vacuum and a cover immovably secured against such reversal of loads and sealed independently of the securing, said valve pot having a cylindrical bore and a counterbore of larger diameter at the upper end of the cylindrical bore and open radially inwardly to the cylindrical bore, said valve pot having a cover seat on the upper end of the same about said counterbore, a one-piece cover having a flange in solid metal-to-metal engagement with said cover seat and having a dependent integral cylindrical plug portion of a diameter slightly less than the bore of the valve pot and extending down through the larger diameter counterbore into the upper end of the cylindrical bore of the valve pot, studs securing the flange of the cover in metal-to-metal seated engagement on the valve pot and stressed to hold the cover fixed against reversal of loads in the valve pot, a compressible gasket seated in the counterbore about the cylindrical plug portion of the cover and free to be compressed radially inwardly against said dependent cylindrical plug portion of the cover, a sealing ring vertically slidable over said cylindrical plug portion and slidable in the counterbore over the top of said gasket, a pin projecting from said cylindrical portion of the cover, said sealing ring having an opening receiving the projecting end of said pin and loosely confining the ring to said dependent cover portion and of sufficient vertical extent to permit gasket sealing adjustment of the ring when the cover is fixed in position on the valve pot, adjusting screws on the cover in line with said sealing ring and thrust plugs interposed between the ends of said screws and the top of the ring.

GEORGE E. CAMPBELL.

References Cited in the file of this patent

UNITED STATES PATENTS

| Number | Name | Date |
| --- | --- | --- |
| 1,367,348 | Barnes | Feb. 1, 1921 |
| 1,841,882 | Francisci | Jan. 19, 1932 |
| 2,226,495 | Jacobs | Dec. 24, 1940 |
| 2,492,409 | Worn et al. | Dec. 27, 1949 |

FOREIGN PATENTS

| Number | Country | Date |
| --- | --- | --- |
| 691,144 | Germany | May 17, 1940 |